(Model.)
S. H. BELLOWS.
BEAM CALIPERS.
No. 427,956. Patented May 13, 1890.
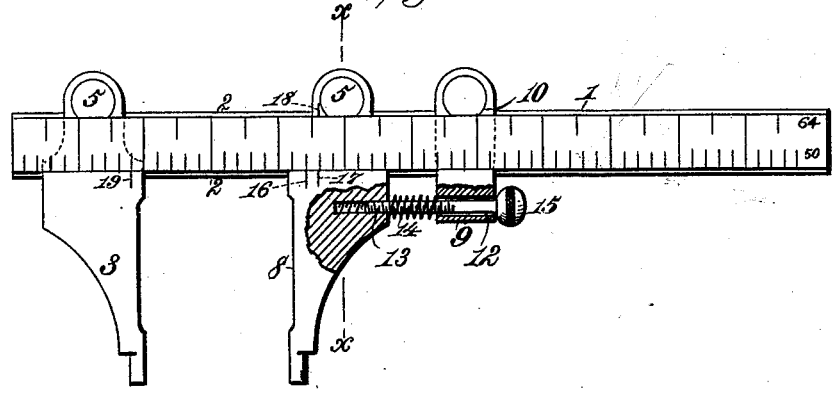
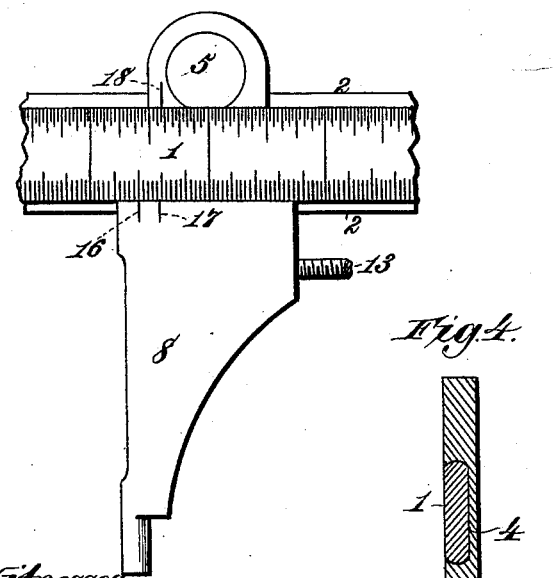
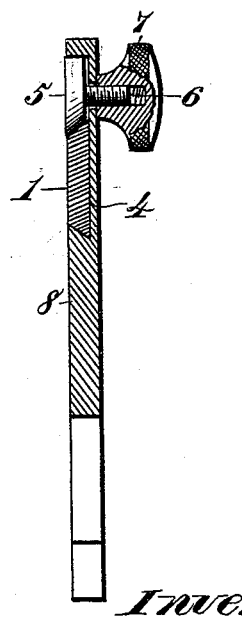
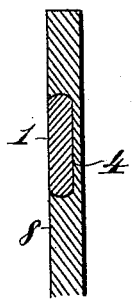
Witnesses.
Robt. Everett
J. A. Rutherford
Inventor.
Stephen H. Bellows.
By James L. Norris.
Atty.

UNITED STATES PATENT OFFICE.

STEPHEN H. BELLOWS, OF ATHOL, MASSACHUSETTS.

BEAM-CALIPERS.

SPECIFICATION forming part of Letters Patent No. 427,956, dated May 13, 1890.

Application filed December 26, 1889. Serial No. 334,983. (Model.)

*To all whom it may concern:*

Be it known that I, STEPHEN H. BELLOWS, a citizen of the United States, residing at Athol, in the county of Worcester and State of Massachusetts, have invented new and useful Improvements in Open-Faced Beam-Calipers, of which the following is a specification.

My invention relates to that class of instruments commonly known as "beam-calipers," in which the caliper-arms are adjustable upon a graduated beam or rule.

It is the purpose of said invention to provide a simple construction whereby the entire graduated face of the beam shall be visible and available for measurements of every kind, and to provide the adjustable caliper-arm with index-marks so arranged with reference to the graduation of the beam that accurate adjustments and measurements may be made to the smallest fractional subdivisions of an inch without the necessity of graduating the beam to the highest degree of attenuation, whereby the eye of the user is liable to become confused and the accuracy of adjustment seriously impaired, while the labor and expense of manufacture are materially enhanced.

It is my object, in short, to provide a beam-caliper having graduations to the fiftieth or any other fractional parts of an inch, wherein the face of the adjustable caliper-arm is provided with index-marks which may be brought into coincidence with the said graduations alternately, thereby securing adjustments and measurements of exactly half the highest graduations of the beam.

The invention consists in the several novel features of construction and new combinations of parts hereinafter fully set forth, and then definitely pointed out in the claims following this specification.

To enable others skilled in the art to make, construct, and use my said invention, I will describe the same in detail, reference being had to the accompanying drawings, in which—

Figure 1 is a front elevation of a beam-caliper embodying my invention. Fig. 2 is a partial elevation, upon an enlarged scale, showing the manner of graduation of the beam and the position of the index-marks upon the caliper-arm with reference to such graduation. Fig. 3 is a transverse section on the line $x\ x$, Fig. 1. Fig. 4 is a transverse section showing a slightly-modified construction.

In the said drawings, the reference-numeral 1 designates the beam of the calipers, consisting of a flat strip or bar of steel or other material suitable for the purpose. The opposite faces of the beam are parallel, and the longitudinal edges 2 are beveled oppositely toward the face to which the graduations are applied. These graduations are of two kinds, a scale being applied to one edge of the beam containing divisions up to the sixty-fourth part of an inch, while upon the other and parallel edge the divisions are extended to the fiftieth part of an inch only.

Upon the beam 1 is mounted an arm 3, having a thickness somewhat in excess of that of the beam and provided in its broader end with a dovetailed recess 4, which receives the beam. In the end of the arm below this recess is formed a segmental recess which receives a disk 5, carried by a threaded pin 6, which passes through an aperture in the arm and projects from the back side thereof, where it receives a milled nut 7. A portion of the disk 5 is removed, and the straight edge thus formed is beveled to correspond with the bevel of the edge of the beam. By turning the milled nut 7 the straight beveled edge of the disk may be drawn with considerable force against the edge of the beam, thereby locking the arm firmly in position at any point to which it may be adjusted. The other arm 8, which may be termed the "adjustable" arm, is constructed in a manner similar to that described and is locked by similar means. Upon the beam in rear of this arm is mounted a secondary or auxiliary slide 9, having a lock 10, which is the counterpart of the holding device 5 and nut 7. Through an opening 12 in the end of the slide 9 is passed a threaded spindle 13, the end of which is tapped into the rear edge of the arm 8, a spiral spring 14 being coiled on said spindle between the secondary slide and the arm. It will be seen that by locking the auxiliary slide 9 in position and operating the spindle by means of a milled nut 15 an exceedingly delicate adjustment may be given to the adjustable arm 8.

Upon the flat face of the arm 8, which is flush with the graduated face of the beam, is placed an index-mark 16, which is exactly one-tenth of an inch from the working-face of the arm. Upon the same face of the arm 8, at a little distance from the mark 16, is placed a separate mark 17, the interval between the two being such that when the mark 16 is caused to coincide with one of the divisions of the scale the mark 17 will stand exactly half-way between two of the graduations marking a division of one-fiftieth of an inch. If, now, the threaded spindle 13 be operated until said mark 17 is caused to coincide with either of the marks between which it stands, it will be seen that the caliper-arm will have an adjustment of exactly the one-hundredth part of an inch, whereupon the mark 16 will equally divide one of the subdivisions of the beam.

Upon the foot of the arm 8 is an index-mark 18, which coincides with the graduations of the scale to sixty-fourths of an inch. Inasmuch, however, as it is not desirable to divide the sixty-fourth part of an inch no secondary mark is applied. By this arrangement I am able to secure extremely accurate adjustment to the one-hundredth part of an inch upon a scale of fiftieths of an inch, thereby avoiding the confusion to the eye which unavoidably arises when the graduation is extremely close. The same principle can be applied to measurements of the two-hundredth part of an inch, &c., by the addition of a further differential index mark or marks. A mark 19 is also formed upon the base of the arm 3, one tenth of an inch from the working-face, to correspond to the decimal scale with which said mark must coincide. It will readily be seen that by varying the interval between the index-marks 16 and 17, I may obtain still further fractional measurements. For example, while the second mark is shown in the drawings as placed at a distance from the first of nine one-hundredths of an inch I may make this interval ninety-nine one-thousandths of an inch, and thus obtain differential measurements of the one-thousandth part of an inch without additional graduations upon the beam. I may also modify the construction of the beveled edges of the beam—as, for example, by making them half-round, as shown in Fig. 4, or of any other form which will admit of a longitudinal adjustment and an exposure of the entire graduated face of the beam, which should be flush, or substantially so, with the parts having coinciding marks to enable the coincidence to be more accurately determined.

Upon the extremities of the arms 3 and 8, I form points 3ª, which may be used for inside measurements in the manner already well known.

I do not wish to be understood as claiming herein that which is described and shown by my Letters Patent No. 403,726, issued May 21, 1889. In the instrument described and shown by that patent the fine measurements depend solely on a micrometer measuring-screw without regard to the half-inch graduations on the beam, and in this respect the former instrument is quite different from that herein described and shown.

What I claim is—

1. An open-faced beam-caliper gage consisting of the following elements, to wit: a beam having on one face two linear scales of different subdivisions, a pair of caliper-arms having one face arranged in the plane of the graduated face of the beam, and one of said caliper-arms provided with a series of index-marks which, respectively, co-operate, substantially as described, with the two linear scales for the desired fine measurements.

2. An open-faced beam-caliper consisting of a flat beam or rule having beveled edges and provided with two scales of different subdivisions of an inch, and caliper-arms adjustable on said beam, one of said arms being provided with index-marks which coincide with the graduations of the beam alternately as the arm is adjusted, substantially as described.

3. In an open-faced beam-caliper, the combination, with the flat beam or rule having oppositely-beveled edges and provided upon one flat face at or near the edges with two differential graduated scales, of arms having dovetailed recesses to receive the beam, disks having straight beveled edges engaging one edge of the beam and provided with spindles operated by nuts, a secondary or auxiliary slide, a threaded spindle connecting said slide and one of the arms, and a spring coiled thereon between the slide and arm, the latter being provided with two index-marks on its flat face at the edge, said marks being arranged at such interval that they will coincide with the graduations alternately, substantially as described.

4. In an open-faced beam-caliper, the combination, with a rule having oppositely-beveled edges and provided with differential graduations upon its narrower face, said graduations extending to the angle of the bevel, of adjustable caliper-arms having dovetailed recesses which receive the rule, bringing the open faces of said arms substantially flush with the graduated face of the rule, disks lying in recesses in the ends of said arms and having straight beveled edges engaging the edge of the rule and provided with screws receiving nuts, an adjustable slide, a threaded spindle engaging the slide and tapped into the arm, and a spring coiled on the spindle and flat face of one or more of said arms being provided with index-marks which can only coincide with the graduations of the rule successively or alternately, substantially as described.

5. In an open-faced beam-caliper, the combination, with a rule having a series of graduations indicating the higher fractional divisions of an inch, of an adjustable arm having graduations which upon the adjustment of the arm coincide with the successive graduations of the rule alternately, substantially as described.

In testimony whereof I have affixed my signature in presence of two witnesses.

STEPHEN H. BELLOWS.

Witnesses:
GEO. T. JOHNSON,
OSCAR A. SCOTT.